US011926790B2

United States Patent
Recio, III et al.

(10) Patent No.: US 11,926,790 B2
(45) Date of Patent: *Mar. 12, 2024

(54) COMPOSITIONS AND METHODS USING SUBTERRANEAN TREATMENT FLUIDS COMPRISING WATER-SOLUBLE POLYMERS

(71) Applicant: Halliburton Energy Services, Inc., Houston, TX (US)

(72) Inventors: Antonio Recio, III, Houston, TX (US); Gladys Rocio Montenegro-Galindo, Houston, TX (US); Jason Maxey, Houston, TX (US); Denise Nicole Benoit, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,177

(22) Filed: Oct. 27, 2022

(65) Prior Publication Data
US 2023/0060530 A1 Mar. 2, 2023

Related U.S. Application Data

(62) Division of application No. 17/288,790, filed as application No. PCT/US2018/062465 on Nov. 26, 2018, now Pat. No. 11,518,929.

(51) Int. Cl.
  *C09K 8/68* (2006.01)
  *C09K 8/60* (2006.01)
  (Continued)

(52) U.S. Cl.
  CPC ............... *C09K 8/68* (2013.01); *C09K 8/602* (2013.01); *C09K 8/80* (2013.01); *E21B 43/267* (2013.01); *C09K 2208/28* (2013.01)

(58) Field of Classification Search
None
See application file for complete search history.

(56) References Cited

U.S. PATENT DOCUMENTS 3,624,019 A  11/1971  Anderson et al.
3,734,873 A   5/1973  Anderson et al.
(Continued)

FOREIGN PATENT DOCUMENTS

WO  WO03085232 A1  10/2003
WO  WO2020112077 A1  6/2020

OTHER PUBLICATIONS

International Search Report and Written Opinion issued in related PCT Application No. PCT/US2018/062465 dated Aug. 19. 2019, 9 pages.

*Primary Examiner* — Andrew Sue-Ako
(74) *Attorney, Agent, or Firm* — Conley Rose, P.C.; Rodney B. Carroll (57) ABSTRACT

Compositions and methods using subterranean treatment fluids comprising water-soluble polymers are provided. In some embodiments, the methods include: adding an anionic or amphoteric water-soluble polymer to a treatment fluid comprising an aqueous base fluid; adding a dewatering agent to the treatment fluid, wherein the dewatering agent comprises an aqueous phase, a solvent, a co-solvent, and one or more surfactants selected from the group consisting of: ethoxylated alcohol, a polyamine polyether, a resin alkoxylated oligomer, and any combination thereof; and introducing the treatment fluid into a well bore penetrating at least a portion of the subterranean formation.

13 Claims, 3 Drawing Sheets

(51) Int. Cl.
*C09K 8/80* (2006.01)
*E21B 43/267* (2006.01)

(56) References Cited

U.S. PATENT DOCUMENTS

| | | |
|---|---|---|
| 3,997,492 A | 12/1976 | Kane et al. |
| 4,024,097 A | 5/1977 | Slovinsky et al. |
| 4,147,681 A | 4/1979 | Lim et al. |
| 4,525,496 A | 6/1985 | Adaway et al. |
| 6,476,168 B1 | 11/2002 | Dahanayake et al. |
| 6,485,651 B1 | 11/2002 | Branning |
| 7,429,625 B2 | 9/2008 | Harrington et al. |
| 8,846,769 B2 | 9/2014 | Mallo et al. |
| 9,708,562 B2 | 7/2017 | Soane et al. |
| 9,822,297 B2 | 11/2017 | Brinkman et al. |
| 9,957,437 B2 | 5/2018 | Li et al. |
| 11,518,929 B2 | 12/2022 | Recio, III et al. |
| 2002/0169085 A1 | 11/2002 | Miller et al. |
| 2006/0142172 A1 | 6/2006 | Cioletti et al. |
| 2013/0137611 A1 | 5/2013 | Pierce et al. |
| 2013/0274149 A1 | 10/2013 | Lafitte et al. |
| 2014/0323366 A1 | 10/2014 | Parnell et al. |
| 2015/0344769 A1 | 12/2015 | Suresh et al. |
| 2017/0233636 A1* | 8/2017 | Bake .............. C09K 8/528 507/242 |
| 2018/0201829 A1 | 7/2018 | Hikem et al. |
| 2020/0165510 A1 | 5/2020 | Recio, III et al. |
| 2020/0377788 A1 | 12/2020 | Recio III et al. |
| 2022/0002615 A1 | 12/2022 | Recio, III et al. |
| 2023/0060530 A1 | 3/2023 | Recio, III et al. |

\* cited by examiner

COMPOSITIONS AND METHODS USING SUBTERRANEAN TREATMENT FLUIDS COMPRISING WATER-SOLUBLE POLYMERS

CROSS-REFERENCE TO RELATED APPLICATIONS

This application is a Divisional of and claims priority to U.S. patent application Ser. No. 17/288,790 filed Apr. 26, 2021, published as U.S. Patent Application Publication No. 2022/0002615 A1, and entitled "Compositions and Methods Using Subterranean Treatment Fluids Comprising Water-Soluble Polymers," which is a filing under 35 U.S.C. 371 of International Application No. PCT/US2018/062465 filed Nov. 26, 2018, both of which are incorporated herein by reference in their entirety.

BACKGROUND

The present disclosure relates to compositions and methods for treating a subterranean formation.

Treatment fluids may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations may include, for example, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes.

Friction reducers are typically included in treatment fluids during pumping into a well bore penetrating a subterranean formation to minimize damage to the formation. Generally, friction reducers comprise a chemical additive that functions to alter the rheology of the treatment fluid by increasing the viscosity and lowering the friction. Friction reducers may be high molecular weight polymers, such as those having a molecular weight of at least about 2,500,000. Such polymers may be linear and flexible. Suitable friction reducers include water-soluble polymers.

One example of a treatment fluid that may utilize a friction reducer is a hydraulic fracturing fluid. Hydraulic fracturing is a process commonly used to increase the flow of desirable fluids, such as oil and gas, from a portion of a subterranean formation. In hydraulic fracturing, a fracturing fluid may be introduced into the subterranean formation at or above a pressure sufficient to create or enhance one or more factures in the formation. Enhancing a fracture may include enlarging a pre-existing fracture in the formation. Friction reducers may be included in the fracturing fluid to reduce frictional energy losses within the fluid and to increase the viscosity under low shear forces, such as within fractures, to aid in the placement of proppant particulates in the fractures.

BRIEF DESCRIPTION OF THE DRAWINGS

These drawings illustrate certain aspects of some of the embodiments of the present disclosure and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to compositions and methods for treating a subterranean formation. More particularly, the present disclosure relates to compositions and methods for using in subterranean treatment fluids comprising water-soluble polymers used to treat subterranean formations.

The present disclosure provides compositions comprising a friction reducer and a dewatering agent. The friction reducer may be an anionic or amphoteric water-soluble polymer. The dewatering agent may comprise an aqueous phase, a solvent, a co-solvent, and at least one surfactant. In certain embodiments, the friction reducer and the dewatering agent may be added to a treatment fluid having an aqueous base fluid. In certain embodiments, the treatment fluid may further comprise a plurality of proppant particulates.

The present disclosure also provides methods of treating a subterranean formation using the compositions of the present disclosure. In certain embodiments, the methods of the present disclosure comprise introducing a treatment fluid comprising an aqueous base fluid, a water-soluble polymer, and a dewatering agent into a well bore penetrating a subterranean formation. In certain embodiment, the methods of the present disclosure comprise adding a water-soluble polymer and a dewatering agent, either together or separately, into a treatment fluid and/or a well bore penetrating a subterranean formation. In some embodiments, the water-soluble polymer and the dewatering agent may be added to a treatment fluid before or after the treatment fluid is introduced into the well bore. In certain embodiments, the methods of the present disclosure may further comprise introducing the treatment fluid into one or more fractures within the subterranean formation.

Among the many potential advantages to the methods and compositions of the present disclosure, only some of which are alluded to herein, the methods and compositions of the present disclosure may increase the viscosity of treatment fluids while maintaining friction reduction abilities (e.g., turbulence reduction) and, in some embodiments, may do so without increasing water-soluble polymer concentration. The methods and compositions of the present disclosure may also aid in suspension of proppant within the treatment fluid and/or placement of proppant in fractures within subterranean formation.

The treatment fluids of the present disclosure may include any aqueous base fluid known in the art. In certain embodiments, the aqueous base fluid may be present in the treatment fluid in an amount from about 0.5 weight ("wt.") % to about 99 wt. % by volume of the treatment fluid. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of monovalent and/or divalent cationic species dissolved therein. In certain embodiments, the one or more ionic species may be selected from the group consisting of: H, Li, Na, K, Cs, Be, Mg, Ca, Sr, Ba, Cr, Fe, Mn, Co, Ni, Cu, Ga, In, $NH_4$, and any combination thereof. In certain embodiments, the density of the aqueous fluid may be adjusted, among other purposes, to provide additional particulate transport and suspension in the compositions of the present disclosure. In certain embodiments, the treatment fluids may include a mixture of one or more aqueous fluids with other fluids and/or gases, including but not limited to emulsions, foams, and the like.

The treatment fluids of the present disclosure may comprise a friction reducer. In certain embodiments, the treatment fluid may comprise the friction reducer in an amount from about 0.05 wt. % to about 1.5 wt. % by volume of the treatment fluid. In other embodiments, the treatment fluid may comprise the friction reducer in an amount from about 0.1 wt. % to about 1.0 wt. % by volume of the treatment fluid. In other embodiments, the treatment fluid may comprise the friction reducer in an amount from about 0.2 wt. % to about 0.6 wt. % by volume of the treatment fluid. In certain embodiments, the friction reducer may be in an emulsion when added to the treatment fluid.

In certain embodiments, the friction reducer may comprise one or more water-soluble polymers. In certain embodiments, the water-soluble polymers may have a molecular weight from about 100.000 g/mol to about 20,000.000 g/mol. In certain embodiments, the water-soluble polymers may be anionic or amphoteric. In certain embodiments, the water-soluble polymers may comprising one or more of the following monomers: acrylic acid, 2-acrylamido-2-methylpropane sulfonic acid (AMPS), 2-(meth)acrylamido-2-methylpropane sulfonic acid, 2-amino-2-methyl-1-propanol (AMP), N,N-dimethylacrylamide (DMF), vinyl sulfonic acid, N-vinyl acetamide, N-vinyl formamide, itaconic acid, methacrylic acid, acrylic acid ester, methacrylic acid ester, acrylonitrile (including hydrolyzed products of acrylonitrile residues), acrylonitrile-dimethyl amine reaction products. [2-(acryloyloxy)ethyl] trimethylammonium chloride (AETAC), acrylamide (including alkyl-, aryl-, alkenyl-, and di-substituted derivatives thereof), ($C_1$ to $C_{30}$) acrylic esters, any salts thereof, and any combination thereof.

In certain embodiments, the water-soluble polymer may comprise a latex-based component. As used herein, the term "latex-based component" refers to one or more monomers having at least one vinyl moiety that are emulsified with one or more surfactants in mineral oil and water and polymerized. In certain embodiments, the water-soluble polymer may be an emulsion polyacrylate-based material. In some embodiments, the water-soluble polymer may have the following chemical formula: $CH_2CHC(O)NR^1{}_2$, $CH_2C(CH_3)C(O)NR^1{}_2$, $CH_2CH(CH_2)_nC(O)NR^1{}_2$, or $CH_2C(CH_3)(CH_2)_nC(O)NR^1{}_2$. In such embodiments, n may be an integer from about 0 to about 6. $R^1$ may be selected from the group consisting of: —H, —$C_2H_4OH$, —$CH_3$, —$(CH_2)_mCH_3$, wherein m is an integer from about 2 to about 25. In other embodiments, the water-soluble polymer may have the following chemical formula: $(CH_2CH)C(O)OR^2$, $CH2C(CH_3)C(O)OR^2$, $CH_2CH(CH_2)_nC(O)OR^2$, or $CH_2C(CH_3)(CH_2)_nC(O)OR^2$. In such embodiments, n may be an integer from about 0 to about 6. $R^2$ may be selected from the group consisting of: —H, a ($C_1$ to $C_{20}$) hydrocarbon chain, or a counterion. The counterion ion may be selected from the group consisting of: Li, Na, K, Cs, Be, Mg, Ca, Sr, Ba, Cr, Fe, Mn, Co, Ni, Cu, Ga, In, and $NH_4$. In one embodiment, the friction reducer comprises a first water-soluble polymer having the chemical formula: $CH_2CHC(O)NR^1{}_2$, $CH_2C(CH_3)C(O)NR^1{}_2$, $CH_2CH(CH_2)_nC(O)NR^1{}_2$, or $CH_2C(CH_3)(CH_2)_nC(O)NR^1{}_2$, as described above, in an amount from about 50 wt. % to about 85 wt. % by weight of the friction reducer and a second water-soluble polymer having the chemical formula: $(CH_2CH)C(O)OR^2$, $CH_2C(CH_3)C(O)OR^2$, $CH_2CH(CH_2)_nC(O)OR^2$, or $CH_2C(CH_3)(CH_2)_nC(O)OR^2$, as described above, in an amount from about 15 wt. % to about 50 wt. % by weight of the friction reducer.

As used herein, the term "hydrocarbon" refers to a molecule or functional group that includes at least carbon and hydrogen atoms. Hydrocarbon chains are referred to herein using ($C_a$ to $C_b$), wherein a and b are positive integers that designate a range of the number of carbon atoms that the hydrocarbon may contain. A hydrocarbon chain may be or contain an alkyl group, an alkenyl group, an alkynyl group, an aryl group, a cycloalkyl group, an acyl group, or any combination thereof. Unless otherwise specified herein, a hydrocarbon chain as used herein may be substituted or unsubstituted and branched or unbranched.

The treatment fluids of the present disclosure may comprise a dewatering agent. In certain embodiments, the treatment fluid may comprise the dewatering agent in an amount from about 0.001 wt. % to about 4.0 wt. % by volume of the treatment fluid. In other embodiments, the treatment fluid may comprise the dewatering agent in an amount from about 0.01 wt. % to about 2.0 wt. % by volume of the treatment fluid. In other embodiments, the treatment fluid may comprise the dewatering agent in an amount from about 0.05 wt. % to about 1.5 wt. % by volume of the treatment fluid.

In certain embodiments, the dewatering agent may comprise an aqueous phase. In certain embodiments, the dewatering agent may be an aqueous external emulsion. The aqueous phase of the dewatering agent may comprise any suitable water, such as fresh water, de-ionized water, salt water, brine, produced water, flowback water, brackish water, or sea water. In certain embodiments, the water may be a salt water or brine. In such embodiments, the salt may be any suitable salt, such as at least one of NaBr, $CaCl_2$, $CaBr_2$, $ZnBr_2$, KCl, NaCl, a carbonate salt, a sulfonate salt, sulfite salts, sulfide salts, a phosphate salt, a phosphonate salt, a magnesium salt, a bromide salt, a formate salt, an acetate salt, and a nitrate salt. In certain embodiments, the water may have a concentration of at least one salt from about 0.1 wt. % to about 20 wt. % by volume of the water.

In certain embodiments, the aqueous phase may be present in the dewatering agent in an amount from about 0.001% to about 80% by volume, based on the volume of the dewatering agent. In other embodiments, the aqueous phase may be present in the dewatering agent in an amount from about 20% to about 80% by volume, based on the volume of the dewatering agent. In other embodiments, the aqueous phase may be present in the dewatering agent in an amount from about 30% to about 70% by volume, based on the volume of the dewatering agent. In other embodiments, the aqueous phase may be present in the dewatering agent in an amount from about 40% to about 60% by volume, based on the volume of the dewatering agent.

In certain embodiments, the dewatering agent may comprise a solvent. As used herein, the term "solvent" refers to a substance that can dissolve one or more solutes (e.g., a chemically distinct liquid, solid, or gas) to form a solution. The solvent of the dewatering agent may comprise methyl 9-decenoate, methyl 9-dodecenoate, N,N-dimethyl 9-decenamide, diethyl carbonate, triethyl citrate, dimethyl 2-methylglutarate, dodecyl acetate. l-dodecyl-2-pyrrolidinone, 2-dodecyl-pyrrolidinone, N—$(C_2H_4)CH_3$-pyrrolidinone (wherein n is from about 1 to about 22), n-octyl-pyrrolidinone, dibutyl ether, isoamyl ether, di-n-amyl ether, dihexyl ether, heptyl ether, dioctyl ether, dodecyl ether, benzyl hexyl ether, branched or linear di-n-alkyl-ethers having the formula $O[(CH_2)_xCH_3]_2$ (wherein x is from about 3 to about 35), a dibasic ester having the formula $CH_3OC(O)(CH_2)_mC(O)OCH_3$ (wherein m is from about 2 to about 4), and any combination thereof. In certain embodiments, the solvent of the dewatering agent may comprise a linear dibasic ester, a branched dibasic ester, and any combination thereof. In certain embodiments, the solvent of the dewatering agent may be selected from the group of dimethyl 2-methylglutarate, 1-dodecyl-2-pyrrolidinone, N—$(C_2H_4)_nCH_3$-pyrrolidinone (wherein n is from about 6 to about 12), dimethyl succinate, dimethyl glutarate, dimethyl adipate, and any combination thereof. In other embodiments, the solvent of the dewatering agent may be dimethyl 2-methylglutarate.

In certain embodiments, the solvent may be present in the dewatering agent in an amount from about 0.01% to about 50% by volume, based on the volume of the dewatering agent. In other embodiments, the solvent may be present in the dewatering agent in an amount from about 0.1% to about 25% by volume, based on the volume of the dewatering agent. In other embodiments, the solvent may be present in the dewatering agent in an amount from about 1.0% to about 20% by volume, based on the volume of the dewatering agent. In other embodiments, the solvent may be present in the dewatering agent in an amount from about 2.0% to about 15% by volume, based on the volume of the dewatering agent. In other embodiments, the solvent may be present in the dewatering agent in an amount from about 2.5% to about 10% by volume, based on the volume of the dewatering agent.

In certain embodiments, the dewatering agent may comprise a co-solvent. As used herein, the term "co-solvent" refers to a substance that can dissolve one or more solutes (i.e., a chemically distinct liquid, solid, or gas) to form a solution and enhance the solvency of another solvent. The co-solvent of the dewatering agent may comprise any alcohol that is at least partially miscible with water. In certain embodiments, the co-solvent may be an alcohol that is branched or unbranched and primary, secondary, or amyl. In certain embodiments, the co-solvent may be: methanol, ethanol, n-propanol, isopropanol, n-butanol, 2-butanol, n-pentanol, 1-hexanol, 2-hexanol, neopentyl alcohol, isodecyl alcohol, isotridecyl alcohol, allyl alcohol, crotyl alcohol, 3-buten-2-ol, 2-methyl-2-propen-1-ol, propargyl alcohol, cyclic-secondary alcohols, or any combination thereof.

In certain embodiments, the co-solvent may be present in the dewatering agent in an amount from about 0.5% to about 85% by volume, based on the volume of the dewatering agent. In other embodiments, the co-solvent may be present in the dewatering agent in an amount from about 1.0% to about 60% by volume, based on the volume of the dewatering agent. In other embodiments, the co-solvent may be present in the dewatering agent in an amount from about 5.0% to about 50% by volume, based on the volume of the dewatering agent. In other embodiments, the co-solvent may be present in the dewatering agent in an amount from about 15% to about 45% by volume, based on the volume of the dewatering agent. In other embodiments, the co-solvent may be present in the dewatering agent in an amount from about 20% to about 35% by volume, based on the volume of the dewatering agent.

In certain embodiments, the dewatering agent may comprise one or more surfactants. In certain embodiments, the surfactants may be selected from the group consisting of: an ethoxylated surfactant, a polyamine polyether, a resin alkoxylated oligomer, and any combination thereof. The surfactants of the dewatering agent may be present in the dewatering agent in an amount from about 0.1% to about 30% by volume, based on the volume of the dewatering agent. The surfactants of the dewatering agent may be present in the dewatering agent in an amount from about 5% to about 25% by volume, based on the volume of the dewatering agent. The surfactants of the dewatering agent may be present in the dewatering agent in an amount from about 10% to about 20% by volume, based on the volume of the dewatering agent. In one embodiment, the dewatering agent may comprise an ethoxylated surfactant, a polyamine polyether, and a resin alkoxylated oligomer, each present in the dewatering agent in an amount from about 2.0% to about 10% by volume, based on the volume of the dewatering agent. In another embodiment, the dewatering agent may comprise an ethoxylated surfactant, a polyamine polyether, and a resin alkoxylated oligomer, each present in the dewatering agent in an amount from about 3.0% to about 7.0% by volume, based on the volume of the dewatering agent. In another embodiment, the dewatering agent may comprise an ethoxylated surfactant, a polyamine polyether, and a resin alkoxylated oligomer, each present in the dewatering agent in about 5.0% by volume, based on the volume of the dewatering agent.

The ethoxylated surfactant of the dewatering agent may function, inter alia, as a surface tension modifier. In certain embodiments, the ethoxylated surfactant of the dewatering agent may be selected from the group of ethoxylated alcohols, ethoxylated amines, ethoxylated esters, ethoxylated amides, secondary alcohol ethoxylates having from 6 to 25 carbon atoms and 1 to 18 ethylene oxide groups, and any combination thereof. In certain embodiments, the ethoxylated surfactant may be selected from linear, primary tridecyl alcohol ethoxylates having from 12 to 18 carbon atoms and 18 ethylene oxide units, secondary alcohol ethoxylates having 15 carbon atoms and 15 ethylene oxide units, and any combination thereof. In other embodiments, the ethoxylated surfactant may be one or more linear, primary alcohol ethoxylates having from 12 to 14 carbon atoms and 7 ethylene oxide units. In certain embodiments, the ethoxylated surfactant may be an ethoxylated alcohol may have the following chemical formula: $RO(CH_2CHO_2O)_nH$, where R is a hydrocarbon chain and n is an integer. In certain embodiments, R may be a ($C_8$ to $C_{25}$) hydrocarbon chain. In other embodiments, R may be a ($C_{10}$ to $C_{20}$) hydrocarbon chain. In other embodiments, R may be a ($C_{12}$ to $C_{14}$) hydrocarbon chain. In certain embodiments, n is an integer from about 3 to about 20. In certain embodiments, n is an integer from about 5 to about 18. In other embodiments, n is an integer from about 7 to about 14.

In certain embodiments, the polyamine polyether may be selected from the group of polyols, amine oxyalkylates, alkoxylated polyamines, amine-initiated polyol block copolymers, ethylenediamine ethoxylated and/or propoxylated, polyethyleneimine polymers, and any combination thereof. In certain embodiments, the polyamine polyether in the dewatering agent may be a polyol. Examples of polyols suitable for use as the polyamine polyether of the dewatering agent are sold by Solvay in association with the names and trade designations Clearbreak® 195, Clearbreak® 217, and Clearbreak® 218. Additional examples of polyols suitable for use as the polyamine polyether of the dewatering agent are sold by Croda in association with the names and trade designations Kemelix® D317, Kemelix D501, Kemelix® D503, Kemelix®D506, Kemelix® D511, Synperonic® PE/L121, and Synperonic® PE/L64. Additional examples of polyols suitable for use as the polyamine polyether of the dewatering agent are sold by Huntsman in association with the names and trade designations Surfonic® OFD 101, Surfonic® OFD 328, Surfonic® OFD 335, Surfonic® POA-17R2, Jeffox® WL 660, and Jeffox WL 5000. Additional examples of polyols suitable for use as the polyamine polyether of the dewatering agent are sold by Dow in association with the names and trade designations Demtrol® 1010, Demtrol® 1020, Demtrol® 1030, Demtrol® 1040, Demtrol® 1113, Demtrol® 1114, Demtrol® 1115, and Demtrol® 1130.

In certain embodiments, the polyamine polyether in the dewatering agent may be an amine oxyalkylate. An example of an amine oxyalkylate that is suitable for use as the polyamine polyether of the dewatering agent is sold by Solvay in association with the name and trade designation Clearbreak® 291. Additional examples of amine oxyalkylates suitable for use as the polyamine polyether of the dewatering agent are sold by AkzoNobel in association with the names and trade designations Witbreak™ DPG-482, Witbreak™ DRI-9026. Witbreak™ GT-705, Witbreak™ GT-750, and Witbreak™ GT-756.

In certain embodiments, the polyamine polyether in the dewatering agent may be an alkoxylated polyamine. Examples of alkoxylated polyamines that are suitable for use as the polyamine polyether of the dewatering agent are sold by Huntsman in association with the names and trade designations Surfonic® OFD 150, Surfonic® OFD 300, Surfonic® OFD 301. Surfonic® OFD 302, and Surfonic® OFD 360. Additional examples of alkoxylated polyamines that are suitable for use as the polyamine polyether of the dewatering agent are sold by BASF in association with the names and trade designations Basorol® DB-9904, Basorol® P DB-5951, and Basorol®904. In certain embodiments, the polyamine polyether surfactant may have the following structure:

In such embodiments, $R_1$ and $R_2$ each may be independent selected from the group consisting of: an alkyl, an alkenyl, a vinyl, an allyl, an alkynyl, an aryl, a phenyl, a benzyl, and a proparyl. In such embodiments, X may be an oxyalkoxo group having the following structure:

in which W may be a ($C_1$ to $C_5$) alkylene, 2-methyl propylene, 2,2-dimethyl propylene, or have one of the following structures:

wherein y is an integer representing from about 0 to about 6 methylene units.

In certain embodiments, the polyamine polyether surfactant may have the following structure:

wherein $M_1$, $M_2$, $M_3$, and $M_4$ each have the following structure:

In such embodiments, R may be selected from the group consisting of: methyl, ethyl, and propyl. $R_1$ and $R_2$ each may be independent selected from the group consisting of: an alkyl, an alkenyl, a vinyl, an allyl, an alkynyl, an aryl, a phenyl, a benzyl, and a proparyl. The variable "z" may be an integer from about 1 to about 25. In such embodiments, R, $R_1$, and $R_2$ may be the same or different across $M_1$, $M_2$, $M_3$, and $M_4$. For example, in certain embodiments, $M_1$ may be identical to one or more of $M_2$, $M_3$, $M_4$, and, in certain embodiments, $M_1$ may be different than at least one of $M_2$, $M_3$, and $M_4$.

In certain embodiments, the polyamine polyether in the dewatering agent may be an amine-initiated polyol block copolymer. Examples of amine-initiated polyol block copolymers that are suitable for use as the polyamine polyether of the dewatering agent are sold by Dow in association with the names and trade designations Demtrol® 4026, Demtrol® 4017, Demtrol® 4110, Demtrol® 4115, and Demtrol® 4120.

In certain embodiments, the polyamine polyether in the dewatering agent may be an ethylenediamine ethoxylated and/or propoxylated, polyethyleneimine polymer. Examples of ethylenediamine ethoxylated and/or propoxylated, polyethyleneimine polymers that are suitable for use as the polyamine polyether of the dewatering agent are sold by Croda in association with the names and trade designations Kemelix® 3216x, Kemelix® 3422X, Kemelix® 3551X, Kemelix®) 3515X, Kemelix® D510, and Kemelix® D513. Additional examples of ethylenediamine ethoxylated and/or propoxylated, polyethyleneimine polymers that are suitable for use as the polyamine polyether of the dewatering agent are sold by BASF in association with the names and trade designations Basorol™ P DB-9390. Basorol® P DB-9392, Basorol® P DB-9360, and Basorol®P DB-9393. An additional example of an ethylenediamine ethoxylated and/or propoxylated, polyethyleneimine polymer that is suitable for use as the polyamine polyether of the dewatering agent is sold by Sasol in association with the name and trade designation Diammin™ EDA-72.

The resin alkoxylated oligomer of the dewatering agent may function, inter alia, as a demulsifier. In certain embodiments, the resin alkoxylated oligomer of the dewatering agent may be selected from the group of phenol formaldehyde ethoxylates, alkoxylated alkyl phenol formaldehyde resins, epoxy resin alkoxylates, poly diepoxide ethoxylates, phenolic resins, methyloxirane polymers, phenol formaldehyde polymers with methyloxirane, phenol formaldehyde oxiranes, and any combination thereof. In certain embodiments, the resin alkoxylated oligomer of the demulsifying agent may be an ethoxylated phenol formaldehyde resin or 4-nonylphenol formaldehyde with methyloxirane and oxirane.

In certain embodiments, the treatment fluids of the present disclosure may comprise proppant particulates. Examples of materials that may be suitable for use as proppant particulates in certain embodiments of the present disclosure include, but are not limited to, fly ash, silica, alumina, fumed carbon (e.g., pyrogenic carbon), carbon black, graphite, mica, titanium dioxide, metalsilicate, silicate, kaolin, talc, zirconia, boron, hollow microspheres (e.g., spherical shell-type materials having an interior cavity), glass, sand, bauxite, sintered bauxite, ceramic, calcined clays (e.g., clays that have been heated to drive out volatile materials), partially calcined clays (e.g., clays that have been heated to partially drive out volatile materials), composite polymers (e.g., thermoset nanocomposites), halloysite clay nanotubes, and any combination thereof. The proppant particulates may be of any shape (regular or irregular) suitable or desired for a particular application. In some embodiments, the proppant particulates may be round or spherical in shape, although they may also take on other shapes such as ovals, capsules, rods, toroids, cylinders, cubes, or variations thereof. In certain embodiments, the proppant particulates of the present disclosure may be relatively flexible or deformable, which may allow them to enter certain perforations, microfractures, or other spaces within a subterranean formation whereas solid particulates of a similar diameter or size may be unable to do so.

In certain embodiments, the treatment fluid may comprise the proppant particulates in an amount from about 0.1 to about 10 pounds of particulates/gallon of treatment fluid (ppg). In other embodiments, the treatment fluid may comprise the proppant particulates in an amount from about 0.1 ppg to about 5.0 ppg. In other embodiments, the treatment fluid may comprise the proppant particulates in an amount from about 0.1 ppg to about 0.5 ppg, in other embodiments, about 0.5 ppg to about 1.0 ppg, in other embodiments, about 1.0 ppg to about 2.0 ppg, in other embodiments, about 2.0 ppg 30 to about 3.0 ppg, in other embodiments, about 3.0 ppg to about 4.0 ppg, in other embodiments, about 4.0 ppg to about 5.0 ppg, in other embodiments, about 5.0 ppg to about 6.0 ppg, in other embodiments, about 6.0 ppg to about 7.0 ppg, in other embodiments, about 7.0 ppg to about 8.0 ppg, in other embodiments, about 8.0 ppg to about 9.0 ppg, and in other embodiments, about 9.0 ppg to about 10 ppg.

In certain embodiments, the treatment fluids of the present disclosure also may comprise any number of additives. Examples of such additives include, but are not limited to, salts, additional surfactants, acids, diverting agents, fluid loss control additives, gas, nitrogen, carbon dioxide, surface modifying agents, tackifying agents, foamers, corrosion inhibitors, scale inhibitors, catalysts, clay stabilizers, shale inhibitors, biocides, additional friction reducers, antifoam agents, bridging agents, flocculants, $H_2S$ scavengers, $CO_2$ scavengers, oxygen scavengers, lubricants, hydrocarbons, viscosifying/gelling agents, breakers, weighting agents, relative permeability modifiers, resins, wetting agents, coating enhancement agents, filter cake removal agents, antifreeze agents (e.g., ethylene glycol), particulates, and the like. A person skilled in the art, with the benefit of this disclosure, will recognize the types of additives that may be included in the treatment fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the water-soluble polymer, the dewatering agent, and/or other components of the treatment fluid may be metered directly into a base fluid to form a treatment fluid. In certain embodiments, the base fluid may be mixed with the water-soluble polymer, the dewatering agent, and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted.

The treatment fluids of the present disclosure may be introduced into a portion of a subterranean formation. The treatment fluid may be, for example, a stimulation fluid, a hydraulic fracturing fluid, a drilling fluid, a spotting fluid, a clean-up fluid, a completion fluid, a remedial treatment fluid, a workover fluid, an abandonment fluid, a pill, an acidizing fluid, a cementing fluid, a packer fluid, a logging fluid, or a combination thereof. In introducing a treatment fluid of the present disclosure into a portion of a subterranean formation, the components of the treatment fluid may be mixed together at the surface (or offsite prior to transport to the wellsite) and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure. In some embodiments, the various other components of the water-soluble polymer, the dewatering agent, and/or other components of the treatment fluids of the present disclosure may be mixed into the treatment fluid during some stages but not others. For example, the water-soluble polymer may be continuously mixed into the treatment fluid, while the dewatering agent is only added in selected stages, among other reasons, to enhance the viscosity and/or other properties of the fluid only during those stages.

The water-soluble polymer and the dewatering agent may be provided in any suitable fashion. In some embodiments, the water-soluble polymer and the dewatering agent may be provided together (either by themselves or with other optional components such as solvents and/or carrier fluids) and then mixed with the base fluid (and optionally other components) substantially simultaneously to form a treatment fluid of the present disclosure. In other embodiments, the water-soluble polymer and the dewatering agent may be mixed into the base fluid separately (either substantially simultaneously or at different times). When added separately, the relative amounts and/or ratios of the water-soluble polymer and the dewatering agent added to the treatment fluid may be varied throughout a particular operation. The water-soluble polymer and the dewatering agent also may be mixed into the treatment fluid in any order and at any place in the mixing or fracturing equipment used in a particular application of the present disclosure. For example, in some embodiments, the dewatering agent may be mixed into the fluid at the same injection point as the water-soluble polymer (e.g., eye of the discharge pump on a fracturing blender), or may be added to the fluid upstream or downstream of that injection point.

The present disclosure in some embodiments provides methods for using the treatment fluids to carry out hydraulic fracturing treatments (including fracture acidizing treatments). In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation. In some embodiments, the treatment fluid may be introduced using one or more pumps. The treatment fluids used in these fracturing treatments may include a number of different types of fluids, including but not limited to pre-pad fluids, pad fluids, fracturing fluids, slickwater fluids, proppant-laden fluids, and the like.

Figure 1:
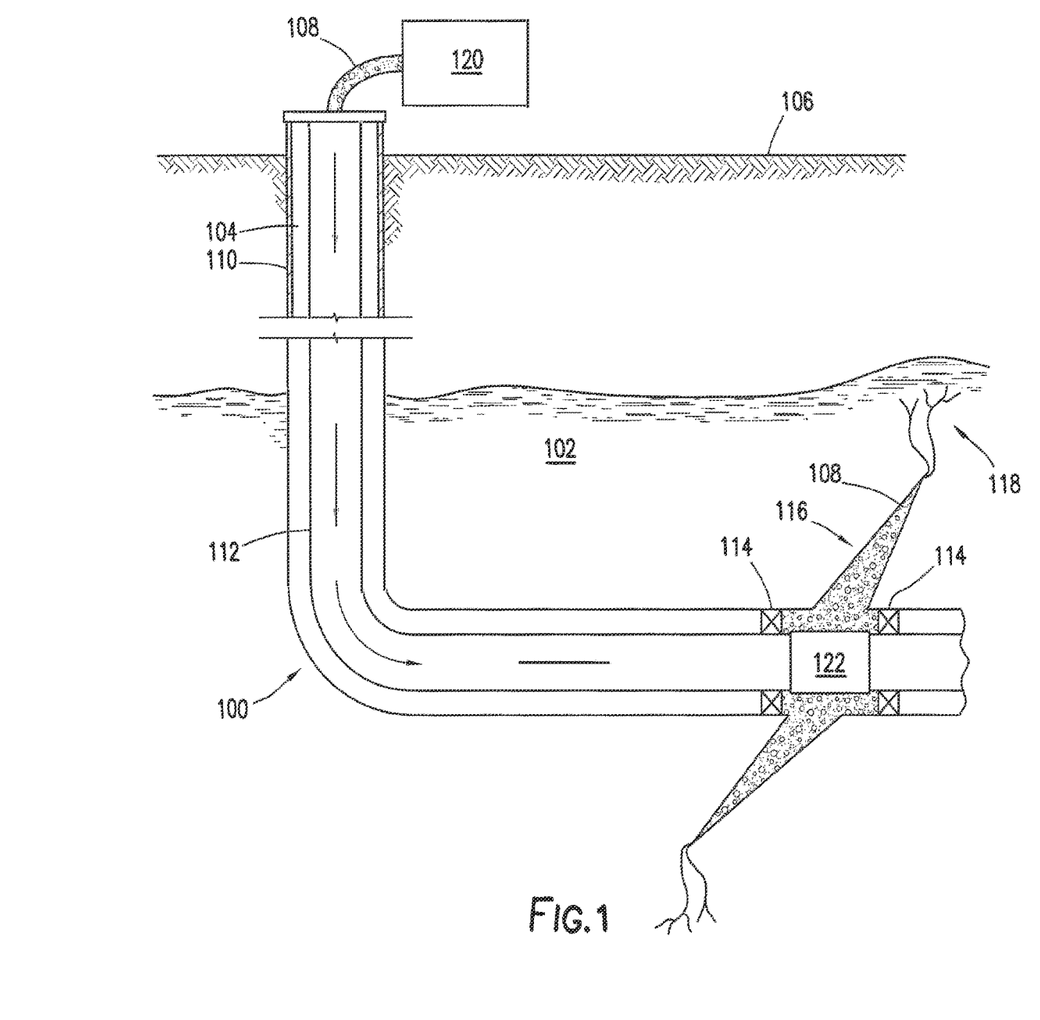
FIG. 1 is a diagram illustrating an example of a subterranean formation in which a fracturing operation may be performed in accordance with certain embodiments of the present disclosure.

FIG. 1 shows a well 100 during a fracturing operation in a portion of a subterranean formation of interest 102 surrounding a well bore 104. The well bore 104 extends from the surface 106, and the treatment fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. A pump and blender system 120, which may include blender 110, is coupled a work string 112 to pump the treatment fluid 108 into the well bore 104. The working string 112 may include coiled tubing, jointed pipe, and/or other structures that allow fluid to flow into the well bore 104. The working string 112 can include flow control devices 122 (e.g., bypass valves, ports, and or other tools or well devices) that control a flow of fluid from the interior of the working string 112 into the subterranean zone 102. For example, the working string 112 may include ports adjacent the well bore wall to communicate a treatment fluid 108 (e.g., fracturing fluid, pad fluids, pre-pad fluids, spacer fluids, as well as other fluids) directly into the subterranean formation 102, and/or the working string 112 may include ports that are spaced apart from the well bore wall to communicate treatment fluid 108 and/or other fluids into an annulus in the well bore between the working string 112 and the well bore wall. The working string 112 and/or the well bore 104 may include one or more sets of packers 114 that seal the annulus between the working string 112 and well bore 104 to define an interval of the well bore 104 into which a treatment fluid 108 or other fluids will be pumped. FIG. 1 shows two packers 114, one defining an uphole boundary of the interval and one defining the downhole end of the interval.

In certain embodiments, the treatment fluid 108 may be introduced into the well bore 104 at or above at or above a certain hydraulic pressure. In such embodiments, when the treatment fluid 108 (e.g., a fracturing fluid) is pumped into the desired interval of the well bore 104 at or above a certain hydraulic pressure, the rock of the subterranean zone 102 "fractures," in that one or more fractures or cracks are created in the zone or one or more existing fractures or cracks in the zone 102 are enlarged or enhanced. In the embodiments shown, the rock matrix of the subterranean zone 102 is of a type that, when fractured, produces both a primary fracture 116 in the near field and secondary fractures 118 (e.g., induced, dendritic fractures or microfractures) in the far field. The secondary fractures 118 have propagated from or near the ends and edges of the primary fracture 116. In certain instances, the subterranean zone 102 is a low permeability zone having a permeability of 1 mD or less. For example, the subterranean zone 102 can include a shale, tight gas, clay, and/or coal bed formation. In certain instances, the rock matrix of the subterranean zone 102 may include cleating or natural fractures (i.e., those that existed prior to, and were not caused by, a fracture treatment). The natural fractures tend to run generally in a direction that is parallel to the primary fracture 116. The secondary fractures 118 run in many directions including directions non-parallel and, in certain instances, perpendicular to the direction of the primary fracture 116. As a result, the secondary fracture 118 can cross, and thereby link, the natural fractures to the primary fracture 116. In certain embodiments, the proppant particulates in the treatment fluid 108 may enter and/or be deposited within one or more of the primary fracture 116 and/or the secondary fractures 108.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1

As shown in Table 1 below, six fluid samples were prepared, each comprising 250 mL of Houston tap water and 0.4 wt. % of a latex-based water-soluble polymer (i.e., friction reducer) of the present disclosure by volume of the sample. Sample 1 contained only these components. Sample 2 further contained 0.1 wt. % of a dewatering agent of the present disclosure by volume of the sample. The dewatering agent comprised a solvent comprising dimethyl 2-methylglutarate (a branched dibasic ester), a co-solvent comprising isopropanol, an ethoxylated alcohol comprising a $C_{12}$-$C_{14}$ ethoxylated alcohol (7EO), a resin alkoxylated oligomer comprising phenol formaldehyde with methyloxirane and oxirane, and a polyamine polyether comprising an alkoxylated polyamine. Samples 3-6 each further contained 0.02 wt. % of one component of the dewatering agent used in Sample 2 by volume of the sample—the solvent, the ethoxylated alcohol, the resin alkoxylated oligomer, and the polyamine polyether, respectively.

TABLE 1

| Component (% weight by volume of sample) | Sample | | | | | |
|---|---|---|---|---|---|---|
| | 1 | 2 | 3 | 4 | 5 | 6 |
| Houston Tap Water | 250 mL | 250 mL | 250 mL | 250 mL | 250 mL | 250 mL |
| Friction Reducer | 0.4% | 0.4% | 0.4% | 0.4% | 0.4% | 0.4% |
| Solvent | — | 0.02% | 0.02% | — | — | — |
| Co-Solvent | — | 0.02% | — | — | — | — |
| Ethoxylated Alcohol | — | 0.02% | — | 0.02% | — | — |
| Resin Alkoxylated Oligomer | — | 0.02% | — | — | 0.02% | — |
| Polyamine Polyether | — | 0.02% | — | — | — | 0.02% |

Figure 2:
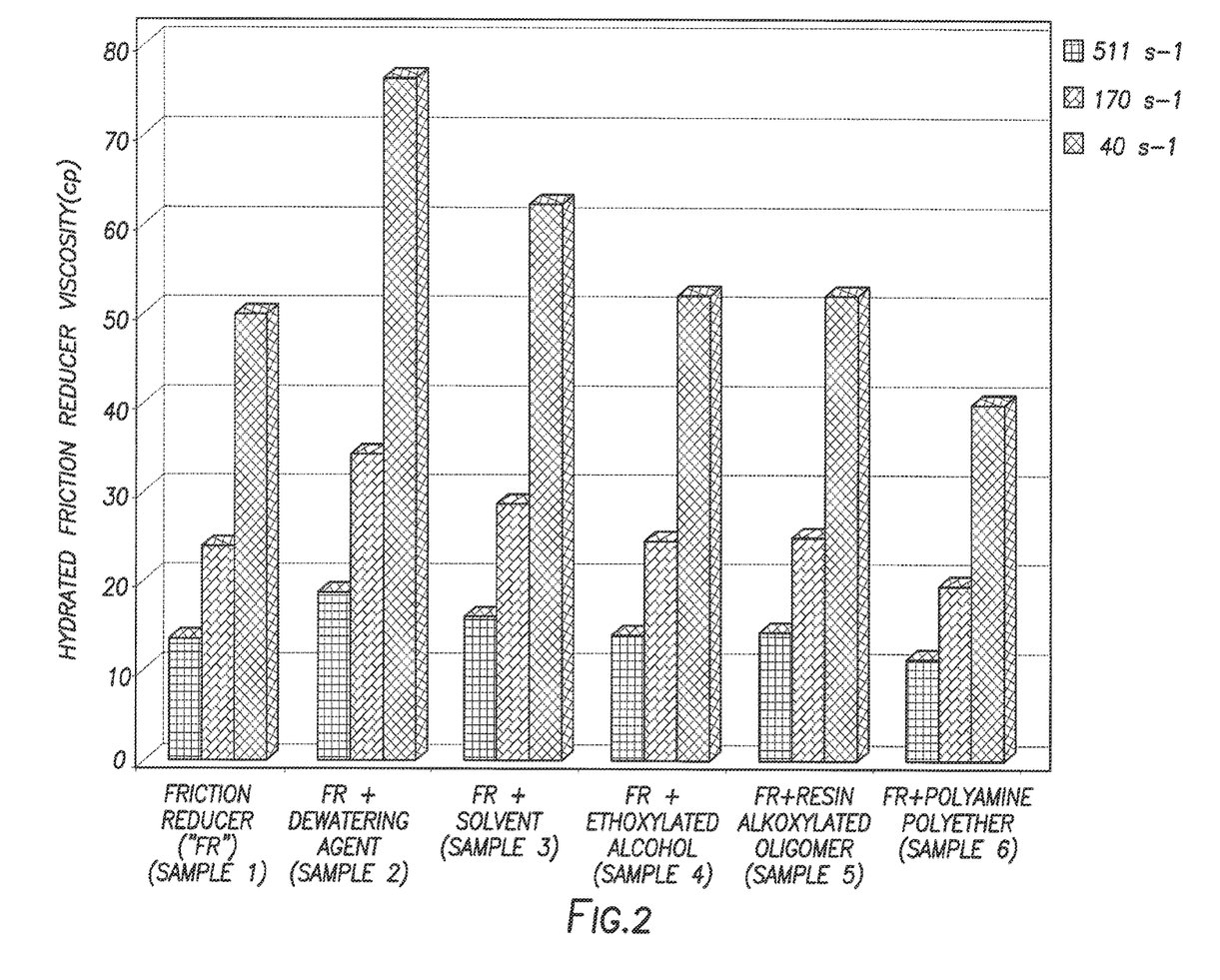
FIG. 2 is a graph illustrating viscosity measurements of compositions in accordance with certain embodiments of the present disclosure.

Each sample was blended, and the friction reducer in each sample was allowed to hydrate for 4 minutes and 10 seconds at room temperature. The viscosity of each samples was then measured at the following 40 s$^{-1}$, 170 s$^{-1}$, and 511 s$^{-1}$ shear rates using an Anton Paar Model 501 rheometer equipped with double gap and cone-plate measuring arrangements. The results are shown in FIG. 2. As shown in FIG. 2, the inclusion of a dewatering agent with a friction reducer according to certain embodiments of the present disclosure resulted in a synergistic improvement of the viscosity of the fluid samples (Sample 2) as compared to the inclusion of the friction reducer alone (Sample 1), particularly at a low shear rate (40 s$^{-1}$). As also shown in FIG. 2, the component of the dewatering agent that appears to be most responsible for this synergistic effect is the solvent comprising a branched dibasic ester as Sample 3 yielded higher viscosities than Sample 4-6.

Example 2

As shown in Table 2 below, six fluid samples were prepared, each comprising 250 mL of deionized water and 0.4 wt. % of a latex-based water-soluble polymer (i.e., friction reducer) of the present disclosure by volume of the sample. Samples 1, 3, and 5 contained only these components. Samples 2, 4, and 6 further comprised 0.1 wt. % of a dewatering agent of the present disclosure by volume of the sample. The dewatering agent comprised a solvent comprising dimethyl 2-methylglutarate, a co-solvent comprising isopropanol, an ethoxylated alcohol comprising a $C_{12}$-$C_{14}$ ethoxylated alcohol (7EO), a resin alkoxylated oligomer comprising phenol formaldehyde with methyloxirane and oxirane, and a polyamine polyether comprising an alkoxylated polyamine.

Each sample was blended, and the friction reducer in each sample was allowed to hydrate for 4 minutes and 10 seconds at the temperatures indicated in Table 2 below. The viscosity of each samples was then measured at the following 40 s$^{-1}$, 170 s$^{-1}$, and 511 s$^{-1}$ shear rates using an Anton Paar Model 501 rheometer equipped with double gap and cone-plate measuring arrangements. The results are shown in Table 2.

TABLE 2

| Temp. | Sample | Composition | 40 s$^{-1}$ | 170 s$^{-1}$ | 511 s$^{-1}$ |
|---|---|---|---|---|---|
| 75° F. | 1 | Water + Friction Reducer | 56.02 | 24.76 | 14.55 |
| | 2 | Water + Friction Reducer + Dewatering Agent | 125.42 | 47.11 | 25.05 |
| 150° F. | 3 | Water + Friction Reducer | 41.38 | 17.69 | 10.12 |

TABLE 2-continued

| Temp. | Sample | Composition | 40 s$^{-1}$ | 170 s$^{-1}$ | 511 s$^{-1}$ |
|---|---|---|---|---|---|
| | 4 | Water + Friction Reducer + Dewatering Agent | 79.11 | 32.07 | 16.86 |
| 180° F. | 5 | Water + Friction Reducer | 34.52 | 15.07 | 8.17 |
| | 6 | Water + Friction Reducer + Dewatering Agent | 67.65 | 26.22 | 13.28 |

As shown in Table 2, the inclusion of a dewatering agent with a friction reducer according to certain embodiments of the present disclosure resulted in a synergistic improvement of the viscosity of the fluid samples (Samples 2, 4, 6) as compared to the inclusion of the friction reducer alone (Samples 1, 3, 5, respectively), particularly at a low shear rate (40 s$^{-1}$). As also shown in Table 2, this synergistic improvement occurred over a range of temperatures from 75° F. to 180° F.

Example 3

As shown in Table 3 below, ten fluid samples were prepared, each comprising 250 mL of Houston tap water and 0.4 wt. % of a latex-based water-soluble polymer (i.e., friction reducer) of the present disclosure by volume of the sample. Friction reducer A in Samples 1-5 comprised a first anionic polyacrylamide polyacrylate copolymer. Friction reducer B in Samples 6-10 comprised a second anionic polyacrylamide polyacrylate copolymer. As also shown in Table 3 below, Samples 2 and 7 further comprised 0.1 wt. % of a dewatering agent of the present disclosure by volume of the sample. The dewatering agent comprised a solvent comprising dimethyl 2-methylglutarate, a co-solvent comprising isopropanol, an ethoxylated alcohol comprising a $C_{12}$-$C_{14}$ ethoxylated alcohol (7EO), a resin alkoxylated oligomer comprising phenol formaldehyde with methyloxirane and oxirane, and a polyamine polyether comprising an alkoxylated polyamine. As further shown in Table 3 below, Samples 3-5 and 8-10 further comprised 0.1 wt. % of another surfactant formulations known in the art: non-ionic flowback aid (Surfactant Formulation 1), a non-ionic microemulsion demulsifier formulation (Surfactant Formulation 2), and a non-ionic microemulsion flowback enhancer (Surfactant Formulation 3).

Each sample was blended, and the friction reducer in each sample was allowed to hydrate for 4 minutes and 10 seconds at 75° F. The viscosity of each samples was then measured at the following 40 s$^{-1}$, 170 s$^{-1}$, and 511 s$^{-1}$ shear rates using an Anton Paar Model 501 rheometer equipped with double gap and cone-plate measuring arrangements. The results are shown in Table 3.

TABLE 3

| Sample | | 40 s$^{-1}$ | 170 s$^{-1}$ | 511 s$^{-1}$ |
|---|---|---|---|---|
| 1 | Water + Friction Reducer A | 49.9 | 24 | 13.75 |
| 2 | Water + Friction Reducer A + Dewatering Agent | 76.19 | 34.28 | 18.67 |
| 3 | Water + Friction Reducer A + Surfactant Formulation 1 | 53.51 | 25.35 | 14.34 |
| 4 | Water + Friction Reducer A + Surfactant Formulation 2 | 50.31 | 24.02 | 13.69 |
| 5 | Water + Friction Reducer A + Surfactant Formulation 3 | 52.1 | 24.66 | 13.96 |
| 6 | Water + Friction Reducer B | 49.52 | 23.88 | 13.71 |
| 7 | Water + Friction Reducer B + Dewatering Agent | 57.21 | 28.44 | 16.71 |
| 8 | Water + Friction Reducer B + Surfactant Formulation 1 | 44.32 | 21.81 | 12.72 |
| 9 | Water + Friction Reducer B + Surfactant Formulation 2 | 36.59 | 20.9 | 13.65 |
| 10 | Water + Friction Reducer B + Surfactant Formulation 3 | 41.3 | 22.82 | 14.53 |

As shown in Table 3, the inclusion of a dewatering agent with a friction reducer according to certain embodiments of the present disclosure resulted in a synergistic improvement of the viscosity of the fluid samples (Samples 2 and 7) as compared to the inclusion of the friction reducer alone (Samples 1 and 6, respectively), particularly at a low shear rate (40 s$^{-1}$). As also shown in Table 3, the dewatering agent of the present disclosure has a more significant synergistic improvement of the viscosity of the fluid samples (Samples 2 and 7) than the other surfactant formulations known in the art (Samples 3-5 and 8-10, respectively).

Example 4

Figure 3:
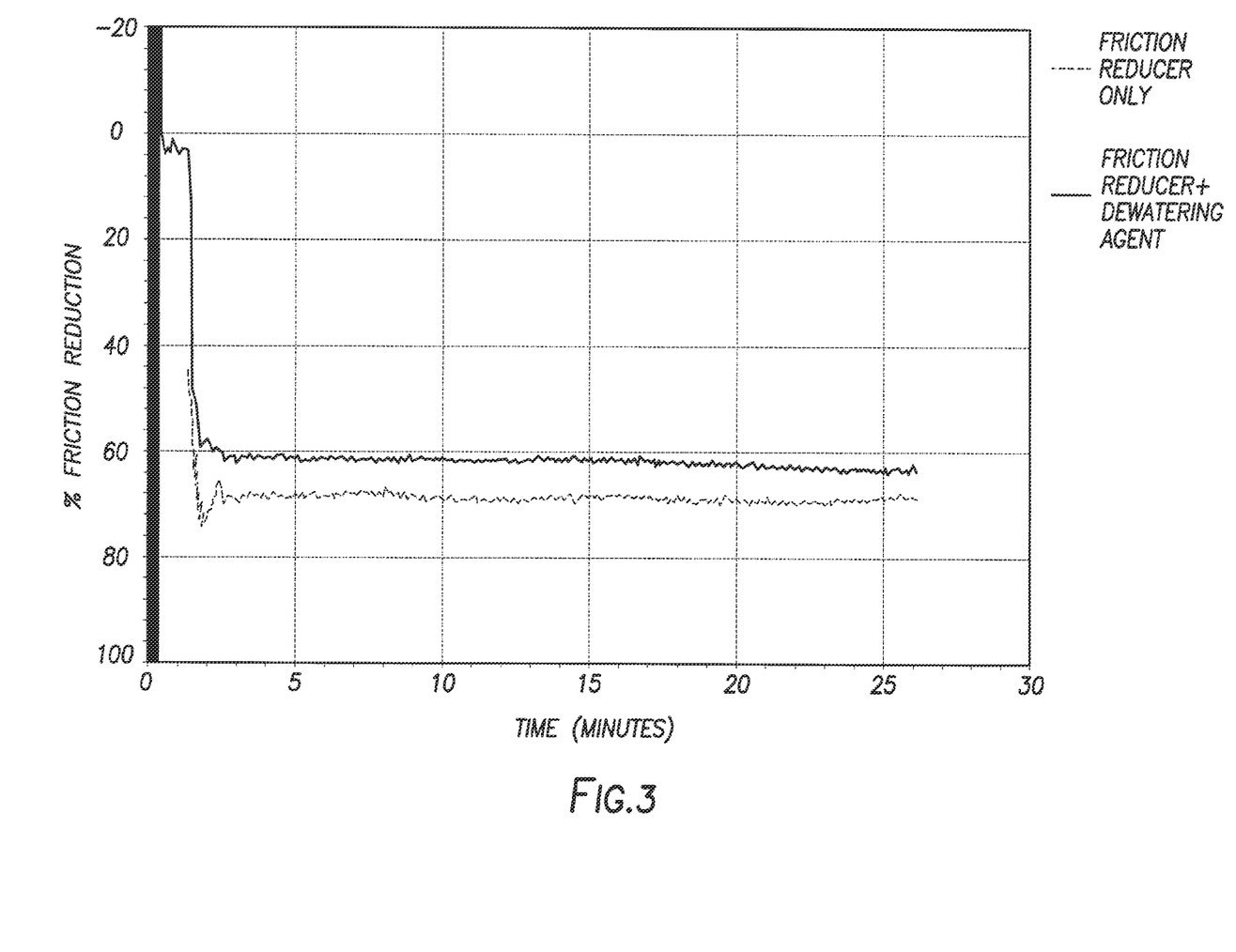
FIG. 3 is a graph illustrating the percentage of friction reduction for compositions in accordance with certain embodiments of the present disclosure.

Two fluid samples were prepared, each comprising 250 mL of Houston Municipal tap water and 1.0 wt. % of a latex-based water-soluble polymer (i.e., friction reducer) of the present disclosure by volume of the sample. The first fluid contained only these components. The second fluid further included 1.0 wt. % of a dewatering agent of the present disclosure by volume of the sample. The dewatering agent comprised a solvent comprising dimethyl 2-methylglutarate, a co-solvent comprising isopropanol, an ethoxylated alcohol comprising a $C_{12}$-$C_{14}$ ethoxylated alcohol (7EO), a resin alkoxylated oligomer comprising phenol formaldehyde with methyloxirane and oxirane, and a polyamine polyether comprising an alkoxylated polyamine. As shown in FIG. 3, the percentage of friction reduction achieved by each fluid sample was measured by pipe flow loop for about 26 minutes. As shown in FIG. 3, both fluid samples achieved over 60% friction reduction for over 20 minutes. Thus. Example 4 demonstrates that the compositions of the present disclosure may increase the viscosity of treatment fluids while maintaining friction reduction abilities.

An embodiment of the present disclosure is a method that includes: adding an anionic or amphoteric water-soluble polymer to a treatment fluid comprising an aqueous base fluid; adding a dewatering agent to the treatment fluid, wherein the dewatering agent comprises an aqueous phase, a solvent, a co-solvent, and one or more surfactants selected from the group consisting of: ethoxylated alcohol, a polyamine polyether, a resin alkoxylated oligomer, and any combination thereof: and introducing the treatment fluid into a well bore penetrating at least a portion of the subterranean formation.

Another embodiment of the present disclosure is a method that includes: introducing a treatment fluid comprising an aqueous base fluid, an anionic or amphoteric water-soluble polymer, and a dewatering agent into a well bore penetrating at least a portion of the subterranean formation, wherein the dewatering agent comprises one or more surfactants and a solvent that is selected from the group consisting of: methyl 9-decenoate, methyl 9-dodecenoate, N,N-dimethyl 9-decenamide, diethyl carbonate, triethyl citrate, dimethyl 2-methylglutarate, dodecyl acetate, 1-dodecyl-2-pyrrolidinone, 2-dodecyl-pyrrolidinone, N—$(C_2H_4)_n$CH$_3$-pyrrolidinone, wherein n is from about 1 to about 22, n-octyl-pyrrolidinone, dibutyl ether, isoamyl ether, di-n-amyl ether, dihexyl ether, heptyl ether, dioctyl ether, dodecyl ether, benzyl hexyl ether, a di-n-alkyl-ether having the formula $O[(CH_2)_xCH_3]_2$, wherein x is from about 3 to about 35, a dibasic ester having the formula $CH_3OC(O)(CH_2)_nC(O)OCH_3$, wherein m is from about 2 to about 4, and any combination thereof.

Another embodiment of the present disclosure is a composition that includes: an anionic or amphoteric water-soluble polymer; and a dewatering agent that comprises: an aqueous phase, a solvent, a co-solvent, and one or more surfactants selected from the group consisting of: ethoxylated alcohol, a polyamine polyether, a resin alkoxylated oligomer, and any combination thereof.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b,"

or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
adding a friction reducer comprising an anionic or amphoteric water-soluble polymer to a treatment fluid comprising an aqueous base fluid;
adding a dewatering agent to the treatment fluid, wherein the dewatering agent comprises an aqueous phase, a solvent, a co-solvent, and a surfactant blend comprising an ethoxylated alcohol, a polyamine polyether and a resin alkoxylated oligomer; and
introducing the treatment fluid into a well bore penetrating at least a portion of a subterranean formation.

2. The method of claim 1, wherein the water-soluble polymer is a latex-based component.

3. The method of claim 1, wherein the solvent is a linear dibasic ester, a branched dibasic ester, or any combination thereof.

4. The method of claim 1, wherein the solvent is selected from the group consisting of: methyl 9-decenoate, methyl 9-dodecenoate, N,N-dimethyl 9-decenamide, diethyl carbonate, triethyl citrate, dimethyl 2-methylglutarate, dodecyl acetate, 1-dodecyl-2-pyrrolidinone, 2-dodecyl-pyrrolidinone, N-$(C_2H_4)nCH_3$-pyrrolidinone, wherein n is from about 1 to about 22, n-octyl-pyrrolidinone, dibutyl ether, isoamyl ether, di-n-amyl ether, dihexyl ether, heptyl ether, dioctyl ether, dodecyl ether, benzyl hexyl ether, a di-n-alkyl-ether having the formula $O[(CH_2)_xCH_3]_2$, wherein x is from about 3 to about 35, a dibasic ester having the formula $CH_3OC(O)(CH_2)_mC(O)OCH_3$, wherein m is from about 2 to about 4, and any combination thereof.

5. The method of claim 1, wherein the solvent is present in the dewatering agent in an amount of from about 0.01% to about 50% by volume based on the volume of the dewatering agent.

6. The method of claim 1, wherein the co-solvent comprises a branched alcohol, an unbranched alcohol, a primary alcohol, a secondary alcohol, an amyl alcohol or a combination thereof.

7. The method of claim 1, wherein the co-solvent comprises methanol, ethanol, n-propanol, isopropanol, n-butanol, b-pentanol, 1-hexanol, 2-hexanol, neopentyl alcohol, isodecyl alcohol, isotridecyl alcohol, allyl alcohol, crotyl alcohol, 3-buten-2-ol, 2-methyl-2-propen-1-ol, propargyl alcohol, cyclic-secondary alcohols or a combination thereof.

8. The method of claim 1, wherein the co-solvent is present in the dewatering agent in an amount of from about 0.5% to about 85% by volume based on the volume of the dewatering agent.

9. The method of claim 1, wherein the resin alkoxylated oligomer is selected from the group consisting of phenol formaldehyde ethoxylates, alkoxylated alkyl phenol formaldehyde resins, epoxy resin alkoxylates, poly diepoxide ethoxylates, phenolic resins, methyl oxirane polymers, phenol formaldehyde polymers with methyloxirane, phenol formaldehyde oxiranes and a combination thereof.

10. The method of claim 1, wherein the surfactant blend is present in the dewatering agent in an amount of from about 0.1% to about 30% by volume based on the volume of the dewatering agent.

11. The method of claim 1, wherein the treatment fluid is introduced into the subterranean formation at or above a pressure sufficient to create or enhance at least one fracture in the subterranean formation.

12. The method of claim 1, wherein the treatment fluid further comprises a plurality of proppant particulates, and wherein the method further comprises depositing at least a portion of the proppant particulates in one or more fractures within the subterranean formation.

13. The method of claim 1, wherein the treatment fluid has an increase in viscosity at a shear rate of 40 $s^{-1}$ of from about 70% to about 120%.

* * * * *